United States Patent [19]
TenBoreck, Jr. et al.

[11] 3,817,983

[45] June 18, 1974

[54] PROCESS USING DIVERSE TYPES OF CELLULOSE FOR PREPARING VISCOSE

[75] Inventors: James TenBoreck, Jr.; Dale Roderic Laurance, both of Lawrence, Kans.

[73] Assignee: E. I. du Pont de Nemours and Company, Wilmington, Del.

[22] Filed: May 1, 1972

[21] Appl. No.: 249,712

[52] U.S. Cl.............. 260/217, 106/164, 260/218, 264/37, 264/188
[51] Int. Cl............................................ C08b 9/00
[58] Field of Search ....... 260/217, 233, 218; 264/37

[56] References Cited
UNITED STATES PATENTS

| | | | |
|---|---|---|---|
| 2,087,016 | 7/1937 | Bradshaw et al. | 264/37 |
| 2,172,109 | 9/1939 | Reichel et al. | 260/231 |
| 2,184,586 | 12/1939 | Donagemma et al. | 260/217 |
| 2,337,928 | 12/1943 | Reichel | 260/212 |
| 2,680,737 | 6/1954 | Grassie et al. | 260/233 |
| 3,584,089 | 6/1971 | Kunkel et al. | 264/37 |

FOREIGN PATENTS OR APPLICATIONS

| | | | |
|---|---|---|---|
| 552,681 | 4/1943 | Great Britain | 260/217 |

*Primary Examiner*—Donald E. Czaja
*Assistant Examiner*—Ronald W. Griffin

[57] ABSTRACT

In a viscose manufacturing process, the additional steps of using diverse forms of cellulosic materials by ball-milling these diverse forms of cellulosic materials and subsequently adding the ball-milled material to the alkali cellulose which is prepared as an intermediate during the process of manufacturing viscose, in an amount up to about 50 percent by weight based on the combined weight of the ball-milled cellulosic material added plus the weight of the cellulose content of the alkali cellulose present.

11 Claims, No Drawings

PROCESS USING DIVERSE TYPES OF CELLULOSE FOR PREPARING VISCOSE

BACKGROUND OF THE INVENTION

This invention relates to an alternate new process of preparing viscose.

It is well known that dissolving grade wood pulp and similar quality cellulose materials can be put into dissolution by the viscose process. This process, in general, comprises:

a. steeping a cellulose material, usually wood pulp, in a caustic soda solution producing alkali cellulose;

b. removing excess caustic soda solution from the alkali cellulose;

c. comminuting the alkali cellulose;

d. aging the comminuted alkali cellulose;

e. treating the aged alkali cellulose with carbon disulfide to form cellulose xanthate; and f. dissolving the cellulose xanthate in a dilute caustic soda solution to form the viscose.

This viscose is typically used in a process for producing regenerated cellulose film wherein the viscose is filtered, deaerated, aged and is then extruded through a film casting die into a sulfuric acid-sodium sulfate solution which coagulates the viscose into a coherent film and decomposes the xanthate to produce a moisture-laden gel film of regenerated cellulose.

After the regenerated cellulose is cast into a film, the film is normally treated by running the film through baths containing agents such as softeners and thereafter coated to improve the barrier properties of the film.

Throughout the process of manufacturing regenerated cellulose, scrap is produced. The scrap is usually yarn waste, film edge trimmings, material rejected as being out of its intended specification tolerance or the beginning or end of a roll of film. It is desirable to reclaim and reuse this waste for both economical and ecological reasons.

There have been many attempts to reclaim the waste cellulose and reuse it in the process. Reclaiming the cellulose includes the removal of softeners, coating materials, and other additives from the waste cellulose leaving a substantially pure grade regenerated cellulose. Reichel, U.S. Pat. No. 2,337,928, for example, teaches one useful method of reclaiming cellulose. Reusing the reclaimed regenerated cellulose, however, has presented some problems.

The prior art teaches that the reclaimed regenerated cellulose usually in chip form can be added to the start of the viscose process along with the wood pulp ultimately ending up as a homogeneous portion of the final viscose. While this can result in a commercially acceptable product, it does mean reprocessing the regenerated cellulose through the complete viscose process.

Additionally, the prior art teaches that the waste cellulose chips can be added to the viscose as a loading material. When added to the viscose, generally without predictability, it may or may not become part of the homogeneous viscose intermediate.

The prior art also includes many varied other process alternatives between these example extremes including the use of special processing sequences, low-temperature viscose manufacturing which can include a freezing step and the use of special dispersion equipment.

In view of this prior art, it has been found that each presents some drawback such as the fact that it is uneconomical, impractical to incorporate in an existing process, or the composition quality or properties of the resulting viscose is unsatisfactory. Therefore, it is desirable to find a convenient and economical process for recycling waste regenerated cellulose that will result in an acceptable final viscose.

In line with ecological thinking and planning for reusing waste products, it would also be desirable to be able to recycle diverse types of cellulosic materials such as used pulp products including newspapers, paper bags, cardboard and computer key punch cards. It would additionally be desirable to use cellulose forms which have not been as highly purified as the typical tree-based dissolving pulps conventionally used in viscose manufacture. This would permit over-all reduction in both process and waste treatment costs including the pulping process used to convert the raw plant material into a form suitable for viscose manufacture plus reduction in virgin raw cellulose material consumed. Furthermore, it would be even more desirable if combinations of the typical forms of cellulose described herein could be used together in the process of making viscose.

SUMMARY OF THE INVENTION

Accordingly, the present invention produces an improved process for using diverse types of cellulosic materials to produce a useful viscose. Specifically, this process is as follows:

In a process of preparing viscose by a. steeping a cellulosic material in a caustic soda solution producing alkali cellulose;

b. removing excess caustic soda solution from the alkali cellulose;

c. comminuting the alkali cellulose;

d. aging the comminuted alkali cellulose;

e. treating the aged alkali cellulose with carbon disulfide to form cellulose xanthate; and f. dissolving the cellulose xanthate in a dilute caustic soda solution to form the viscose, the additional steps comprising ball milling a cellulosic material and adding the ball-milled cellulosic material to the alkali cellulose of step (d) above in an amount up to 50 weight percent based on the combined weight of the ball-milled cellulose material added plus the cellulose content of the alkali cellulose present.

The cellulosic material to be ball milled includes regenerated cellulose, wood pulp, wood pulp products and nontree cellulosic materials. These materials are preferably added to the alkali cellulose by broadcasting the ball-milled material over the surface of the alkali cellulose in an amount of about 15 to 50 weight percent based on the combined weight of the ball-milled material added plus the cellulose content of the alkali cellulose present.

DETAILS OF THE INVENTION

It has been found that many diverse types of cellulosic material either alone or in combination with each other, including those of various degrees of purity or those having various processing histories, can be ball milled and added to the alkali cellulose (which is an intermediate formed during the process of manufacturing viscose) in amounts up to about 50 weight percent of the combined weight of the ball-milled cellulose added plus the cellulose content in the alkali cellulose present to produce a commercially acceptable form of viscose.

For the purpose of this invention, the material herein referred to as "viscose" is of the typical composition used in large-scale commercial processes of 8.9–9.3 percent cellulose and 4.7–5.5 percent alkalinity. Furthermore, "satisfactory viscose quality" is intended to mean commercially acceptable quality, namely, the fact that the viscose produced in the manner of this invention has coagulation-regeneration characteristics plus xanthate dissolution characteristics such as viscosity and filtration which are compatible with a conventional commercial viscose process. These compositions are given by way of example and are not intended to limit the scope of this invention but to define the fact that the viscose produced in accordance with our invention has commercial usefulness comparable with conventionally made viscose.

The diverse types of cellulosic material useful in this invention include regenerated cellulose, wood pulp, wood pulp products, and nontree cellulosic materials.

The regenerated cellulose is generally waste material collected from many sources. It includes yarn waste, film edge trimmings, the beginning or end or a roll of film, crimped sections of film or film that is out of the commercially acceptable specifications. In the event that the regenerated cellulose contains a softener or is coated, the components are removed before the waste is ready for recycle.

The wood pulp includes types of pulp prepared from various types of wood that are known in the art as being useful for producing viscose and wood pulp products.

Wood pulp products include any one of the various products produced from wood pulp such as newspapers, paper bags, computer key punch cards, and writing paper usually as waste material. The waste pulp products can be used in the form that they are found or given some degree of purification depending upon the specific secondary fiber and the amount to be used in the viscose.

Examples of nontree cellulosic materials would be bagasse, cotton, kenaf, wheat straw, corn stalks, etc.

The cellulose material useful in this invention can be purified by conventional methods before use. The desirability of purifying the material depends generally on the end use of the resulting viscose. For example, if the viscose is to be used to make clear cellophane, than all agents that would color the final product should be removed.

The cellulosic material before use can be reduced in size by comminuting it in a conventional cutting, chopping or shredding machine. Comminuting is optional but is preferred since it aids in further processing. This process step is sometimes referred to as "presizing."

After comminuting the cellulosic material, it is fed into a conventional ball mill. The operation and capacity of the ball mill depend upon (1) feed bulk density, (2) cellulosic material moisture content, (3) particle size desired, (4) the physical parameters of the mill, and (5) the nature of the feed.

Under a given set of milling conditions, a ball mill performs best at a specific volumetric loading of grinding media and of materials to be ground. These loadings vary somewhat with the specific mill design and operating conditions. In order to obtain maximum particle size reduction and yet avoid high levels of mill and media wear, these loadings are usually restricted to a rather narrow range. This is true in both batch and continuous mills, the only other limiting factor in a continuous mill being the upper limit at which material will feed into the first few feet of the mill.

Since the effect is primarily a volumetric one, higher bulk density of feed stock improves the ball mill productivity. The change in bulk density is directly related to mill capacity. The moisture content of the material being ground has a marked effect on the rate of grinding. The internal temperature and humidity of the mill will control the material moisture content and by running at the minimum moisture content possible the mill capacity will be at a maximum. To illustrate the effect of moisture during the ball milling of regenerated cellulose, the difference in grinding rate between 15 weight percent water on a cellulose weight basis and essentially no water, such as <0.2 percent, can be equivalent to doubling the mill capacity.

The mill capacity is a direct function of the product particle size specification. A change in product size from 100 mesh maximum to 200 mesh maximum effectively reduces the product rate of the mill. This is due to the increased recycle load required wherein all particles that do not pass the required sieve screen size are recycled back through the mill. The volumetric feed rate which a given mill will process is virtually fixed for a given size of feed material. To decrease the particle size of the product, more material must be recycled and the amount of fresh feed decreased.

The physical parameters for the mill determine its grinding efficiency. For dry grinding, the significant variables include: (1) ratio of density of grinding media to feed density, (2) ratio of mill length to diameter, (3) percent of the critical speed at which the mill is run, (4) volumetric loading of the media, (5) volumetric loading of the material, (6) upper limit on flow of material through the mill, (7) ratio of ball diameter to both mill and particle diameter, (8) the number and height of lifters, (9) the shape of the grinding media, etc. A detailed study of these variables is given by Rose and Sullivan, "Ball, Tube, and Rod Mills," Chem. Publ. Co., Inc., 1958, among others. Other typical factors to consider in ball milling are product temperature and product contamination from the ball mill.

A mill with a diameter too large can result in excessive product temperature, and the only remedy for this process negative is replacement with a smaller mill or adoption of more sophisticated cooling procedures. This temperature factor also mitigates against use of vibratory ball mills, although satisfactory results have been obtained with both reclaimed regenerated cellulose and ether grade pulps ball milled in a vibratory ball mill.

Contamination of the milled product with the ball mill media and liner will occur. Typically, the liner and balls are prepared from ceramic materials. It has been found that the small amount of contamination that does occur is not detrimental to the process and does not adversely affect the end product. Substitution of a steel lining for the ceramic lining has been evaluated and resulting steel contamination has usually not been found objectionable. Generally speaking, of course, the sound level with steel lined mills is greater than with ceramic lined mills, and ceramic contamination of ball-milled cellulosic material is less objectionable than metal contamination for some end uses of the viscose produced from the ball-milled material.

From the previous comments, the importance of the presizing step prior to ball milling is evident. The presizing will permit a minimum design on the ball mill, provide a means of varying the feed size to allow the ball mill to run at maximum efficiency with minimum media and linear wear and reduce the moisture level in the feed from 10 to 5 percent in a typical situation which can increase the mill grinding rate.

After ball milling is complete, the ball-milled material is added to the comminuted alkali cellulose and is preferably added by broadcasting the ball-milled material over the surface of the alkali cellulose. Its assimilation into the alkali cellulose is determined by the ability of the milled material to leach water and caustic from the alkali cellulose. Once a sufficient amount of water and caustic has been leached from the alkali cellulose and an excessive amount has not been leached from alkali cellulose, both the milled material and the alkali cellulose will xanthate and dissolve to form acceptable viscose.

The leaching process requires intimate contact between individual ball-milled cellulosic material and alkali cellulose particles. Typical factors affecting the rate and degree of leaching include: (1) the milled material particle size, (2) the ratio of recycle material to total cellulose flow, (3) the method of distributing the milled material onto the alkali cellulose, (4) the shape of the milled material and (5) the degree of blending given the milled material/alkali cellulose mixture.

The degree to which leaching occurs is partially a function of the probability that any given milled particle will come into intimate contact with alkali cellulose in such a manner that proper rate and amount of diffusion of water and caustic will occur. Tests indicate that once proper particle/alkali cellulose contact is made the time for sufficient leaching to occur is short. However, in the case of reclaimed waste regenerated cellulose, for example, the rate of milled particle to milled particle transfer of water and caustic is very low. Also, excessive local leaching from the alkali cellulose can degrade its xanthation ability. Therefore, the method of distributing milled particles onto the alkali cellulose surface should permit uniform coverage and not allow excessive layering on the alkali cellulose.

The critical compositional nature of the alkali cellulose intermediate in this process has been the subject of innumerable studies as reflected in the literature. A common composition would be 15–16 percent alkalinity and 30–33 percent cellulose. Furthermore, the physical fluffed, crumb-like nature of the alkali cellulose has received equal attention and the critical nature of this crumb in terms of carbon disulfide ($CS_2$) accessability during xanthation and consequent viscose quality has been repeatedly emphasized.

The alkali cellulose plus ground material mixture resulting from the above procedure can differ greatly from the compositions stated as optimum in the literature and still produce commercial grade viscose. The mixture having, for example, 12 percent alkalinity and 50 percent cellulose for a cellulose-alkalinity ratio of 4+/1 vs. 2/1 as commonly claimed in the literature to be a necessity and a ratio of total mix materials to cellulose of 2/1 vs. the ratio of 2.5–3.5/1 also stated in the literature as being critically relatd to final viscose quality.

While particle size is significant in that the smaller the size the less likely is the occurrence of localized inadequate or excessive leaching, the fact that the particles are ball milled is equally significant. The action of the ball mill is such that changes in the physcal chemical nature of the cellulose material occur in addition to the reduction in particle size. Examples of these changes would be loss of birefringent effects, delamination, and reduction in degree of polymerization. Obsiously, the exact combination and degree of such changes will depend to some extent upon the nature of the cellulose form being milled. For example, desirable delamination in the thickness direction of film is especially noticed with ball-milled recovered waste cellophane film and adjustment of ball milling parameters in the direction of increasing the extent of this delamination is associated with improved viscose quality parameters such as filterability.

The net effect of these changes is that widely variant cellulose forms, such as those given in the subsequent examples of this invention, are made similar in nature by the means of this invention. The ball is unique in this respect when compared to other types of size reduction equipment. In addition, no method of size reduction other than ball milling has been found as effective in yielding a milled cellulose product which will xanthate properly yielding a smooth and relatively unagglomerated viscose having filterability in the range normal for commercial viscose even at equivalent screen sizes. For example, recovered regenerated cellulose chips that have been hammer milled to give a screen analysis equal to the <120 mesh product produced in a continuous ball mill do not xanthate as well and have inferior viscose filtration at the same alkali cellulose milled chip mixing level. On the basis of the failure of direct shear or ordinary impact cutting to perform as well, and the demonstration that the physical effects of the ball mill on the cellulose are critical, ball milling has been found necessary to attain reasonable confidence in a full-scale process where many diverse forms of cellulosic matter are to be utilized.

The extent to which ball milling is carried out is dependent upon such ball-mill parameters as discussed above, the degree of mixing provided in the aged alkali cellulose when the ball-milled material is broadcast over the surface of the aged alkali cellulose, and the type of material being milled. Therefore, it is not possible to prescribe a specific manner, amount or length of time for ball milling that would apply to all applications. Instead, this must be determined experimentally.

The quantity of ball-milled cellulosic material that can be utilized in accordance with the concept of this invention is dependent on practical considerations. For example, increased mixing of ball-milled material plus alkali cellulose mixture will permit increased amounts of ball-milled material. Properties desired in the final product made from the viscose can dictate the amount of material recycled. For these and other practical process limitations, it has been found practical to substitute alternate cellulosics for conventional wood pulp cellulose in an amount up to about 50 weight percent, preferably 15 to 50 weight percent, based on the combined weight of the cellulose present in the alkali cellulose plus the ball-milled material present.

An important advantage of this invention is the fact that use of high-cost dissolving types of wood pulp conventionally used in the viscose process for making cellophane is no longer necessary. By the means of this invention, a great variety of vascular plant based materials, such as cellophane, wood fibers, vegetable fibers and secondary fibers, can be reduced to essential equivalency especially insofar as final viscose utility is concerned. Thus, a wide range of materials can be used as the source of cellulose for maufacturing commercial viscose. It is also apparent that the addition of up to 50 percent of the cellulosic matter in viscose by the means of this invention will increase capacity of the conventional alkali cellulose part of the process.

The following examples further illustrate this invention. All parts, percentages and ratios are by weight unless otherwise indicated.

EXAMPLES

Various waste materials were each separately processed in a ball mill. These materials and ball milling results are tabulated below. After ball milling, each material that had been ball milled was added to alkali cellulose in the weight proportions, based on combined ball-milled material and cellulose present in the alkali cellulose, indicated below. The alkali cellulose/ball-milled material mixture was then further processed by conventional means into viscose. In each case, the viscose produced was an acceptable commercial grade.

A. Newspaper grade kraft pulp was ball milled in a rolling ball mill until about 98 weight percent of the pulp was about $72\mu$ or less in length. This product was added to unaged alkali cellulose in an amount of 50 percent.

B. Reclaimed regenerated cellulose, i.e., softeners and coating removed, was ball milled in a rolling ball mill until the product passed through a U.S. Sieve Screen Size 230 mesh. In separate batches of aged alkali cellulose, this ball-milled regenerated cellulose was added in respective amounts of 15, 20, 30 and 50 weight percent.

C. Ether grade sulfite wood pulp was ball milled in a vibratory ball mill to a 1 weight percent CED (cupra ethylene diamine) viscosity of 13 centipoise and was then further processed in a rolling ball mill to a 1 weight percent CED of 7.7 wherein 92 weight percent of the sulfite wood pulp passed through a U.S. Sieve Screen Size 230 mesh. This was added to aged alkali cellulose in separate batches in an amount of 15, 30 and 50 weight percent sulfite wood pulp.

D. Ball-milled materials produced as in B and C above were mixed 50/50 by weight and this mixture was added to aged alkali cellulose in an amount of 30 weight percent.

E. Unpurified computer cards as used commercially were processed through a rolling ball mill until 97 weight percent passed through a U.S. Sieve Screen Size 230 mesh. This was added to aged alkali cellulose in an amount of 15 weight percent.

F. Newspapers were processed through a rolling ball mill until about 90 weight percent of the newspaper had a length of about $215\mu$ or less. This was added to aged alkali cellulose in an amount of 15 weight percent. The presence of the printing ink did color the intermediate viscose and the final product.

G. Kraft paper grade wood pulp was processed in a rolling ball mill until 92–94 percent passed through a 230-mesh ASTM screen. The product was added to unaged alkali cellulose in the amount of 50 percent.

H. Bleached bagasse pulp was ball milled in a rolling mill to a CED of 7.2 and screened to pass a 230-mesh screen and the screened product was added in the amount of 50 percent to aged alkali cellulose.

I. Crude cotton lint was processed in a rolling ball mill to a 1 percent CED of 18 and then the 230-mesh product was added to unaged alkali cellulose in the amount of 50 percent. When this viscose was cast into cellophane in accordance with the conventional process described above, the normal bleaching solution eliminated all discoloration due to impurities in the beginning cotton lint.

J. Raw kenaf boles were ball milled in a rolling ball mill until 97 percent passed 230 mesh. This product was added to unaged alkali cellulose in the amount of 50 weight percent. When this viscose was cast into cellophane in accordance with the conventional process described above, discoloration due to matter present in the crude beginning kenaf was not completely eliminated by the normal bleaching solution, thus indicating that some purification of this type of crude vascular plant source would be desirable for some final products made from viscose produced in the manner of this invention.

We claim:

1. In a process of preparing viscose by:
   a. steeping cellulose pulp in an excess of caustic soda solution to produce alkali cellulose;
   b. removing excess caustic soda solution from the alkali cellulose;
   c. comminuting the alkali cellulose;
   d. aging the comminuted alkali cellulose;
   e. treating the aged alkali cellulose with carbon disulfide to form cellulose xanthate; and
   f. dissolving the cellulose xanthate in a dilute caustic soda solution to form the viscose;
   the additional steps comprising (1) ball milling at least one cellulosic material selected from the group of regenerated cellulose, wood pulp, wood pulp products, and natural nontree cellulosic materials, and (2) adding the ball-milled cellulosic material to the alkali cellulose in an amount such that, during assimilation of the ball-milled cellulosic material with the alkali cellulose, a sufficient, but not excessive, amount of water and caustic is leached from the alkali cellulose whereby the assimilated mass will xanthate and dissolve to form viscose.

2. The process of claim 1 wherein the ball-milled cellulosic material is added to the alkali cellulose by broad-casting the cellulosic material over the surface of the alkali cellulose.

3. The process of claim 1 wherein the ball-milled cellulosic material is added in the amount of about 15 to 50 weight percent based on the combined weight of the ball-milled cellulosic material added plus the cellulose content of the alkali cellulose present.

4. The process of claim 1 including the step of comminuting the cellulosic material to be ball milled.

5. The process of claim 1 including the step of purifying the cellulosic material to be ball milled.

6. The process of claim 1 wherein the ball-milled cellulosic material is added in an amount up to about 50 weight percent based on the combined weight of the ball-milled cellulose material added plus the cellulose content of the alkali cellulose present.

7. The process of claim 1 wherein the ball-milled material is added to the alkali cellulose prior to aging.

8. The process of claim 1 wherein the ball-milled material is added to aged alkali cellulose.

9. A process wherein the resulting viscose of claim 1 is molded into a sponge product.

10. A process wherein the resulting viscose of claim 1 is filteed, deaerated, aged, and then cast into a film.

11. A process wherein the resulting viscose of claim 1 is filtered, deaerated, aged, and then formed into a fiber.

* * * * *

PO-1050
(5/69)

UNITED STATES PATENT OFFICE
CERTIFICATE OF CORRECTION

Patent No. 3,817,983  Dated June 18, 1974

Inventor(s) James TenBroeck, Jr. and Dale Roderic Laurance

It is certified that error appears in the above-identified patent and that said Letters Patent are hereby corrected as shown below:

On the face of the printed patent, in the heading and in block [75], the first inventor's name should be spelled -- TenBroeck -- instead of "TenBoreck".

Signed and sealed this 29th day of October 1974.

(SEAL)
Attest:

McCOY M. GIBSON JR.
Attesting Officer

C. MARSHALL DANN
Commissioner of Patents